IIII

US011214520B1

(12) United States Patent
Mejía Arcila et al.

(10) Patent No.: US 11,214,520 B1
(45) Date of Patent: Jan. 4, 2022

(54) MORTAR FOR ECO-MASONRY ELEMENT

(71) Applicant: TRUce Global, Inc., Boone, NC (US)

(72) Inventors: Johanna Mercedes Mejía Arcila, Cali (CO); Anthony Neil Keen, Boone, NC (US)

(73) Assignee: TRUce Global, Inc., Boone, NC (US)

( * ) Notice: Subject to any disclaimer, the term of this patent is extended or adjusted under 35 U.S.C. 154(b) by 44 days.

(21) Appl. No.: 16/656,811

(22) Filed: Oct. 18, 2019

Related U.S. Application Data

(60) Provisional application No. 62/747,389, filed on Oct. 18, 2018.

(51) Int. Cl.
| | | |
|---|---|---|
| C04B 28/08 | (2006.01) | |
| C04B 7/17 | (2006.01) | |
| C04B 28/26 | (2006.01) | |

(52) U.S. Cl.
CPC ............. C04B 28/082 (2013.01); C04B 7/17 (2013.01); C04B 28/085 (2013.01); C04B 28/26 (2013.01)

(58) Field of Classification Search
CPC ....... C04B 7/17; C04B 28/082; C04B 28/085; C04B 28/26
See application file for complete search history.

(56) References Cited

U.S. PATENT DOCUMENTS

| | | | |
|---|---|---|---|
| 7,141,112 B2 | 11/2006 | Comrie | |
| 8,118,931 B2 * | 2/2012 | Ellenrieder | C04B 28/08 106/790 |
| 9,126,865 B2 | 9/2015 | Blackstock et al. | |
| 9,321,681 B2 | 4/2016 | Dubey | |
| 9,597,818 B2 | 3/2017 | Abdullah et al. | |
| 9,896,379 B2 | 2/2018 | Camali et al. | |
| 9,902,650 B2 | 2/2018 | Guerini et al. | |
| 10,472,282 B2 | 11/2019 | Autef | |
| 2011/0271876 A1 | 11/2011 | Alter et al. | |
| 2012/0024196 A1 | 2/2012 | Gong et al. | |
| 2014/0048264 A1 | 2/2014 | Chatterji et al. | |
| 2014/0238273 A1 | 8/2014 | Sagoe-Crentsil et al. | |
| 2015/0251951 A1 | 9/2015 | Zhang et al. | |
| 2016/0031117 A1 | 2/2016 | Abdullah et al. | |
| 2016/0145153 A1 | 5/2016 | Hwang et al. | |
| 2017/0057872 A1 | 3/2017 | Easton et al. | |

FOREIGN PATENT DOCUMENTS

| | | | |
|---|---|---|---|
| CN | 1118437 C | | 8/2003 |
| CN | 102325736 A | | 1/2012 |
| CN | 103964710 B | | 1/2015 |
| CN | 107814497 A | * | 3/2018 |
| WO | 2011003918 A1 | | 1/2011 |
| WO | 2014055558 A1 | | 4/2014 |
| WO | 2015049010 A1 | | 4/2015 |
| WO | 2016030904 A1 | | 3/2016 |
| WO | 2016135347 A1 | | 9/2016 |
| WO | 2016179361 A1 | | 11/2016 |

OTHER PUBLICATIONS

Adesanya et al. "Alkali Activation of Ladle Slag from Steel-Making Process", J. Sustain. Metall. (2017) pp. 300-310. DOI 10.1007/s40831-016-0089-x (Year: 2016).*
Aziz et al. "The Characterization of Steel Slag by Alkali Activation", Open Access Library Journal,, 2017, vol. 4: e3816. https://doi.org/10.4236/oalib.1103816 (Year: 2017).*
Dutta et al. "Effect of activator solution on compressive strength of flyash geopolymer blended with slag", Debabrata Dutta Int. Journal of Engineering Research and Applications, vol. 4, Issue 12( Part 2), Dec. 2014, pp. 72-76. ISSN : 2248-9622 (Year: 2014).*
Kabir et al. "Influence of Molarity and Chemical Composition on the Development of Compressive Strength in POFA Based Geopolymer Mortar", Advances in Materials Science and Engineering vol. 2015, Article ID 647071, 15 pages. http://dx.doi.org/10.1155/2015/647071 (Year: 2015).*
Yildirim et al., "Chemical,Mineralogical, andMorphological Properties of Steel Slag", Advances in Civil Engineering vol. 2011, Article ID 463638, 13 pages doi:10.1155/2011/463638 (Year: 2011).*
Derwent-Acc-No. 2017-02241Y, abstract of India Patent Applcation No. IN 201101509 I2, (Year: 2011).*

* cited by examiner

*Primary Examiner* — Anthony J Green
(74) *Attorney, Agent, or Firm* — The Webb Law Firm

(57) ABSTRACT

A mortar for formation of a masonry element includes a co-product from the production of steel and an alkaline solution. A masonry element is formed from the mortar, the masonry element including at least one of a brick, a block, a paver, veneer stone, exterior or interior wall panels, roof tiles, faux slate, faux wood, decorative stone, and a poured structure. A method of forming a masonry element includes providing the mortar and compressing the mortar to form the masonry element.

20 Claims, 2 Drawing Sheets

MORTAR FOR ECO-MASONRY ELEMENT

CROSS REFERENCE TO RELATED APPLICATIONS

This application claims priority to U.S. Provisional Patent Application No. 62/747,389, filed Oct. 18, 2018, the disclosure of which is hereby incorporated in its entirety by reference.

BACKGROUND

1. Technical Field

This disclosure relates to a mortar for forming a masonry element, a masonry element formed from the same, and a method for forming a masonry element.

2. Technical Considerations

Masonry elements, such as bricks, blocks, and pavers, are commonly made from Portland cement. However, such masonry elements formed using Portland cement have certain drawbacks with respect to the properties of the final product. Additionally, masonry elements formed from Portland cement have a high carbon footprint.

SUMMARY

The present disclosure is directed to a mortar for formation of a masonry element, including: a co-product from the production of steel and an alkaline solution.

The mortar may further include from 0 to 75 wt % of an aggregate material. The co-product may include at least one of slag, pickle liquor sludge, swarf, and dust collector particulate. The co-product may include the slag, where the slag may include solid impurities found in the hot liquid steel during production of the steel. The solid impurities may include at least one of carbon, silicon, manganese, phosphorus, and iron. The slag may further include lime and/or dolomite. The co-product may include the slag, where the slag may include at least one of silica, calcium oxide, magnesium oxide, and alumina. The slag may include from 15 to 35 wt % silica and 35 to 55 wt % calcium oxide. The co-product may include the slag, where the slag may be in the form of a powder having an average particle size in the range of 10 to 80 μm. The co-product may include the pickle liquor sludge, where the pickle liquor sludge may include a product from a pickling bath used in the production of steel. The pickling bath may include at least one of sulfuric acid, hydrochloric acid, and nitric acid, where the pickling bath further includes lime, where the steel may be in immersed in the pickling bath to clean residues from the steel. The alkaline solution may include at least of an alkali hydroxide and an alkali silicate. The alkaline solution may include from 2 to 30 wt % of the total weight of the mortar. The co-product may include the slag and the pickle liquor sludge, where the slag may include from 40 to 65 wt % of the total weight of the mortar. The co-product may include the slag and the pickle liquor sludge, where the pickle liquor sludge may include from 5 to 20 wt % of the total weight of the mortar. The mortar may include the aggregate material, where the aggregate material may include at least one of sand, glass, granite, stone, and steel. The mortar may include the aggregate material, where the aggregate material may be free of organic materials. The mortar may include the aggregate material, where the aggregate material may have an average particle size from mesh No. 8 to mesh No. 50. The mortar may be free of organic materials.

The present disclosure is also directed to a masonry element formed from a mortar including: a co-product from the production of steel and an alkaline solution. The masonry element includes at least one of a brick, a block, a paver, veneer stone, exterior or interior wall panels, roof tiles, faux slate, faux wood, decorative stone, and a poured structure.

The present disclosure is also directed to a method of forming a masonry element, comprising: mixing a co-product from the production of steel and an alkaline solution to form a mortar; and forming a masonry element from the mortar Further non-limiting embodiments or aspects are set forth in the following numbered clauses:

Clause 1: A mortar for formation of a masonry element, comprising: a co-product from the production of steel; and an alkaline solution.

Clause 2: The mortar of clause 1, further comprising from 0 to 75 wt % of an aggregate material.

Clause 3: The mortar of clause 1 or 2, wherein the co-product comprises at least one of slag, pickle liquor sludge, swarf, and dust collector particulate.

Clause 4: The mortar of clause 3, wherein the co-product comprises the slag, wherein the slag comprises solid impurities found in the hot liquid steel during production of the steel.

Clause 5: The mortar of clause 4, wherein the solid impurities comprise at least one of carbon, silicon, manganese, phosphorus, and iron.

Clause 6: The mortar of clause 4 or 5, wherein the slag further comprises lime and/or dolomite.

Clause 7: The mortar of any of clauses 3-6, wherein the co-product comprises the slag, wherein the slag comprises at least one of silica, calcium oxide, magnesium oxide, and alumina.

Clause 8: The mortar of clause 7, wherein the slag comprises from 15 to 35 wt % silica and 35 to 55 wt % calcium oxide.

Clause 9: The mortar of any of clauses 3-8, wherein the co-product comprises the slag, wherein the slag is in the form of a powder having an average particle size in the range of 10 to 80 μm.

Clause 10: The mortar of any of clauses 3-9, wherein the co-product comprises the pickle liquor sludge, wherein the pickle liquor sludge comprises a product from a pickling bath used in the production of steel.

Clause 11: The mortar of clause 10, wherein the pickling bath comprises at least one of sulfuric acid, hydrochloric acid, and nitric acid, wherein the pickling bath further comprises lime, wherein the steel is immersed in the pickling bath to clean residues from the steel.

Clause 12: The mortar of any of clauses 1-11, wherein the alkaline solution comprises at least of an alkali hydroxide and an alkali silicate.

Clause 13: The mortar of any of clauses 1-12, wherein the alkaline solution comprises from 2 to 30 wt % of the total weight of the mortar.

Clause 14: The mortar of any of clauses 3-13, wherein the co-product comprises the slag and the pickle liquor sludge, wherein the slag comprises from 40 to 65 wt % of the total weight of the mortar.

Clause 15: The mortar of any of clauses 3-14, wherein the co-product comprises the slag and the pickle liquor sludge, wherein the pickle liquor sludge comprises from 5 to 20 wt % of the total weight of the mortar.

Clause 16: The mortar of any of clauses 2-15, wherein the mortar comprises the aggregate material, wherein the aggregate material comprises at least one of sand, glass, granite, stone, and steel.

Clause 17: The mortar of any of clauses 2-16, wherein the mortar comprises the aggregate material, wherein the aggregate material is free of organic materials.

Clause 18: The mortar of any of clauses 2-17, wherein the mortar comprises the aggregate material, wherein the aggregate material has an average particle size from mesh No. 8 to mesh No. 50.

Clause 19: A masonry element formed from the mortar of any of clauses 1-18, wherein the masonry element comprises at least one of a brick, a block, a paver, veneer stone, exterior or interior wall panels, roof tiles, faux slate, faux wood, decorative stone, and a poured structure.

Clause 20: A method of forming a masonry element, comprising: mixing a co-product from the production of steel and an alkaline solution to form a mortar; and forming a masonry element from the mortar.

BRIEF DESCRIPTION OF THE DRAWINGS

Additional advantages and details of the disclosure are explained in greater detail below with reference to the non-limiting exemplary embodiments that are illustrated in the accompanying schematic figures, in which.

DETAILED DESCRIPTION

Figure 1:
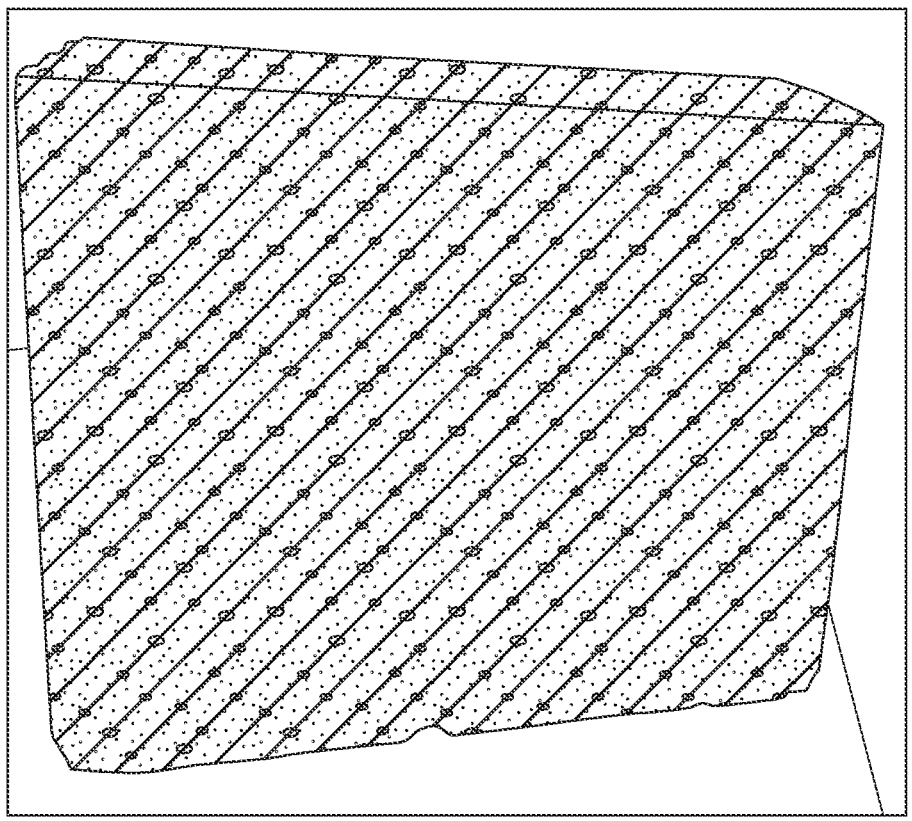
FIG. 1 shows a masonry element formed according to the present disclosure.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth herein are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" mortar, "an" alkaline solution, and the like refer to one or more of any of these items.

The present disclosure relates to a mortar for formation of a masonry element. The mortar includes a co-product from the production of steel (e.g., carbon steel, stainless steel, etc.) and an alkaline solution. The co-product may be a waste product. The mortar may further include an aggregate material. The masonry element may, therefore, be formed from landfill diverted materials, such that its production has a low carbon footprint.

The co-product may include slag, pickle liquor sludge, swarf, and dust collector particulate or a combination thereof. The slag may be c-slag (iron fines) or other types of slag. The dust collector particulate may be non-hazardous dust collector particulate. The dust collector particulate may include ashes. The dust collector particulate may be formed from the combustion process. The co-product may be used as they come out from the steel production facility.

The slag may include a co-product of steel production at a blast furnace. The co-product may be a glass-like by-product of steel production. The slag may include impurities found in the hot liquid steel during production of the steel. The impurities may be solid impurities found in the hot liquid steel. The impurities may include carbon, silicon, manganese, phosphorus, iron and other metal oxides. The impurities may be combined with lime and/or dolomite, commonly used as fluxes to form the slag before molten metal is removed from the furnace.

The slag may include silicate, calcium, and/or aluminate impurities (or some combination of these impurities) present in iron ore and coke. The slag may be composed of silica ($SiO_2$), calcium oxide (CaO), magnesium oxide (MgO), alumina, and combinations thereof, among other oxides in small percentages (e.g., less than 5 wt % or less than 1 wt %). One non-limiting example of the composition of the slag is shown in Table 1 below. In this non-limiting example, the silica and calcium oxide were the most abundant components. Silica and calcium oxide may be presented in the slag in ranges of 15 wt % to 35 wt % and 30 wt % to 55 wt %, respectively.

TABLE 1

| Chemical Compound | Wt % |
|---|---|
| $SiO_2$ | 26.75 |
| $Al_2O_3$ | 4.39 |
| $Fe_2O_3$ | 1.81 |
| CaO | 52.04 |
| $TiO_2$ | 1.21 |
| $K_2O$ | 0.07 |
| Cr | 2.45 |
| MnO | 1.81 |
| MgO | 7.99 |
| $Na_2O$ | 0.44 |
| $SO_3$ | 0.62 |
| Other traces | 0.42 |

The hot slag may be separated from the molten metal by using a ladle where it is cooled down with air and water. After the above mentioned process, the slag may be crushed and/or milled using a wet process and may go through a metal cleaning process to take out remaining metals from the powder. These mentioned processes may be carried out at the steel factory or a downstream facility.

The slag may be a grey powder. The slag may have an average particle size in the range of 10-80 μm, as measured by a laser diffraction analyzer and/or sieves with different mesh sizes. This powder may be used without any conditioning process The slag may comprise from 40 wt % to 65 wt % of the total mortar mix. The slag may comprise at least 40 wt % of the total mortar mix. The slag may comprises up to 65 wt % of the total mortar mix.

The pickle liquor sludge may include a product from the pickling bath stage in the steel production process. The pickling bath may include a metal surface treatment used to clean residues from the steel sheet.

This pickling bath may include sulfuric acid, hydrochloric, nitric acid, or some combination thereof. These acids may remove scale, organic or inorganic impurities, annealing colors, and/or corrosion products. The pickling bath may further include lime and/or other neutralizing agent (e.g., a high pH neutralizing agent). The lime may neutralize the acid solution in the pickling bath. The lime may be added to the solution due to its high pH. The pickle liquor sludge may be the sediment formed from the pickling bath and may have a pH of from 8 to 10.

The pickle liquor sludge may be a brown moisture mud, and this sludge may be decanted and pressed to eliminate water. After this pressed stage it may retain some moisture as a normal mud. The pickle liquor sludge may be used in the mortar directly as it comes out from the pickling bath, without further conditioning steps.

The pickle liquor sludge may have an average particle size in the range of 5 to 50 μm, as measured by a laser diffraction analyzer and/or sieves with different mesh sizes.

The pickle liquor sludge may comprise from 5 wt % to 20 wt % of the total mortar mix. The pickle liquor sludge may comprise at least 5 wt % of the total mortar mix. The pickle liquor sludge may comprise up to 20 wt % of the total mortar mix.

The alkaline solution may include an alkali hydroxide, alkali silicate, or combinations thereof. The alkaline solution may have a solution module (Ms) $SiO_2/M_2O$ in the range of 2.0 to 3.0, where M is an alkali metal element. The alkali hydroxide may be 4 to 8 M, such as 4 to 8 M NaOH.

The alkaline solution may comprise from 2 wt % to 30 wt % of the total mortar mix. The alkaline solution may comprise at least 2 wt %, such as at least 5 wt %, of the total mortar mix. The alkaline solution may comprise up to 30 wt %, such as up to 15 wt %, of the total mortar mix. The mortar may include a dry cast mortar, and the alkaline solution may include 5 wt % to 15 wt % of the total dry cast mortar mix. The mortar may include a wet cast mortar and the alkaline solution may include 2 wt % to 30 wt %, such as 5 wt % to 30 wt %, 10 wt % to 30 wt %, or 15 wt % to 30 wt %, of the total wet cast mortar mix.

A chemical reaction may occur based on the dissolution of Si—O—Si, Al—O—Al, and Al—O—Si bonds present in the slag (e.g., the $SiO_2$ and $Al_2O_3$ compounds). The dissolution of, for example, the calcium aluminosilicate solid from the slag may be achieved by the presence of hydroxyl ions (OH—) in the system provided by the alkaline solution and/or water, which may function as the main catalysts of the reaction. The slag may form calcium aluminosilicate hydrated gel (C-A-S-H) as a reaction product, and may also form metastable $Ca(OH)_2$ which may then react with the sodium and silicate species from the alkaline solution to form more C-A-S-H gel. Calcium oxide from the slag may react and bond with silicate species of the alkaline solution.

The aggregate material may include sand, glass, granite, stone, steel, or other hard material. The sand may be natural sand, and the glass may be crushed glass cullet. The aggregate material may have an average particle size in the range of a mesh No 4 to No 50 (4760 μm to 297 μm). The aggregate material and/or the mortar may be substantially free of (less than 1% by weight) organic materials. The aggregate material and/or the mortar may be free (less than 0.1%) of organic materials.

The aggregate material may comprise from 0 wt % to 75 wt % of the total mortar mix, such as 0 wt % to 60 wt %, 0 wt % to 50 wt %, 0 wt % to 40 wt %, or 0 wt % to 30 wt %. The aggregate material may comprise up to 75 wt % of the total mortar mix, such as up to 60 wt %, up to 50 wt %, up to 40 wt %, or up to 30 wt %.

The mortar may be prepared by mixing the alkaline solution in a range of 10 wt % to 15 wt % with the slag in a range of 40 wt % to 65 wt % and the pickle liquor sludge in range of 5 wt % to 20 wt %, all wt % based on total mortar mix. The materials may be mixed prior to adding the aggregate material. For example, the alkaline solution, slag, and pickle liquor sludge may be mixed for 5 minutes. The mixer may then be stopped and the aggregate material added thereto. The process of mixing may be continued for 5 additional minutes. The mixer may include a planetary mixer machine. The mixer may mix the mortar until a paste with sufficient cohesiveness but with no workability is formed.

The masonry element may be formed using a dry cast method in which the mortar may be moved by a conveyor belt to a compression device (e.g., a brick machine) and placed in the mold which may have different geometric shapes depending on the masonry element to be formed. The mortar in the mold may be compressed to form the masonry element. This dry cast method allows instant demolding of the specimens by ejecting the specimen from the mold.

The masonry element may be formed using a wet cast method in which the mortar is poured into a mold and dried and/or hardened. Upon the mortar drying and/or hardening to form the masonry element, the mold is then stripped away from the masonry element. The mortar used in this wet cast method may use a higher amount of alkaline solution compared to the mortar used in the dry cast method.

The masonry element may be a brick, a block, a paver, veneer stone, exterior or interior wall panels (including interior decorative wall panels), roof tiles, faux slate, faux wood, decorative stone, a poured structure (e.g., the mortar may be poured in place of Portland cement), or other products traditionally made from Portland cement.

The formed masonry element may be dried and/or harden. The masonry element may be dried and/or hardened for at least one day. The masonry element may be dried and/or hardened using a steam chamber operated at 60° C. to 80° C., using a water immersion method, at room temperature (20° C. to 27° C.), using an autoclave, and/or other standard methods depending on the desired properties of the final masonry element.

The final masonry element may be a ceramic-like material different from the conventional ceramic materials like red clay bricks and may be formed using methods that allow for lower drying and hardening temperatures (compared to the red clay bricks), such as temperatures in a range of room temperature to 80° C. This masonry element may be formed from industrial co-products, as previously described. The masonry element may be formed using waste precursors, avoiding addition of a quarry process to the production cycle. The masonry element may be formed without using original natural resources, but with waste precursors. Thus, the masonry element may be formed from a non-Portland dry cast mortar.

Referring to FIG. 1, a masonry element formed according to the present disclosure is shown, and this masonry element has a compressive resistance of approximately 13 MPa according to the ASTM C 90 and is a loadbearing masonry. The compressive resistance of the masonry element may range from 1-20,000 psi (0.007-140 MPa).

Figure 2:
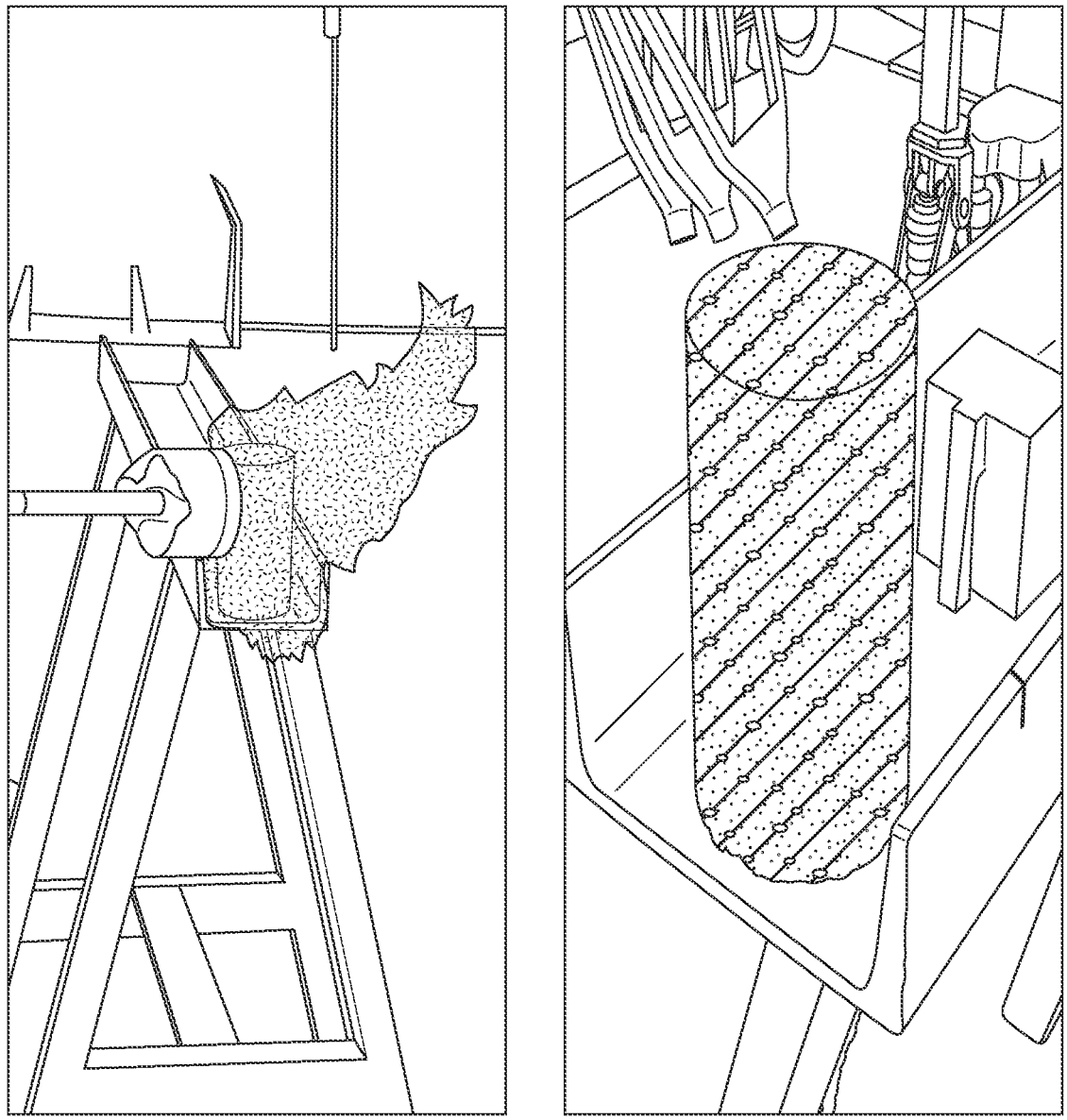
FIG. 2 shows a masonry element formed according to the present disclosure exposed to 900° C. (left) and after being exposed to 900° C. (right).

Referring to FIG. 2, the masonry element may be resistant to direct flame without emitting toxic vapors or losing physical integrity. FIG. 2 shows a masonry element formed according to the present disclosure exposed to 900° C. (left) and after being exposed to 900° C. (right)

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A mortar for formation of a masonry element, comprising:
    a co-product from the production of steel, wherein the co-product comprises pickle liquor sludge; and
    an alkaline solution.

2. The mortar of claim 1, further comprising an aggregate material.

3. The mortar of claim 1, wherein the mortar further comprises at least one calcium source.

4. The mortar of claim 1, wherein the mortar further comprises at least one aluminosilicate source.

5. The mortar of claim 1, wherein the mortar further comprises a slag including calcium and/or aluminosilicate sources.

6. The mortar of claim 3, wherein the calcium source comprises lime and/or dolomite.

7. The mortar of claim 5, wherein the slag comprises from 35 to 55 wt % of the calcium source and/or from 15 to 35 wt % of silica.

8. The mortar of claim 3, wherein the calcium source is in the form of a powder having an average particle size in the range of 10 to 80 µm.

9. The mortar of claim 1, wherein the pickle liquor sludge comprises a product from a pickling bath used in the production of steel.

10. The mortar of claim 9, wherein the pickling bath comprises at least one of sulfuric acid, hydrochloric acid, and nitric acid, wherein the pickling bath further comprises lime, wherein the steel is immersed in the pickling bath to clean residues from the steel.

11. The mortar of claim 1, wherein the alkaline solution comprises at least of an alkali hydroxide and an alkali silicate.

12. The mortar of claim 1, wherein the alkaline solution comprises from 2 to 30 wt % of the total weight of the mortar.

13. The mortar of claim 5, wherein the calcium and/or aluminosilicate source comprises from 40 to 65 wt % of the total weight of the mortar.

14. The mortar of claim 5, wherein the mortar comprises the slag and the pickle liquor sludge, wherein the pickle liquor sludge comprises from 5 to 20 wt % of the total weight of the mortar.

15. The mortar of claim 2, wherein the aggregate material comprises at least one of sand, glass, granite, stone, and steel.

16. The mortar of claim 2, wherein the mortar comprises up to 75 wt % of the aggregate material, wherein the aggregate material has an average particle size from mesh No. 8 to mesh No. 50.

17. The mortar of claim 1, wherein the mortar comprises a wet cast mortar or a dry cast mortar.

18. A masonry element formed from the mortar of claim 1, wherein the masonry element comprises at least one of a brick, a block, a paver, veneer stone, exterior or interior wall panels, roof tiles, faux slate, faux wood, decorative stone, and a poured structure.

19. A method of forming a masonry element, comprising:
    mixing a co-product from the production of steel and an alkaline solution to form a mortar, wherein the co-product comprises pickle liquor sludge; and
    forming a masonry element from the mortar.

20. The method of claim 19, further comprising mixing the co-product and the alkaline solution with at least one of a calcium source, an aluminosilicate source, and an aggregate material to form the mortar.

* * * * *